(12) United States Patent
Palestini et al.

(10) Patent No.: US 6,997,385 B2
(45) Date of Patent: *Feb. 14, 2006

(54) APPARATUS AND METHOD FOR ACQUIRING AND READING OPTICAL CODES WITH RESULT INDICATION

(75) Inventors: Valeria Palestini, Bologna (IT); Nicola Alessi, Bologna (IT); Giacomo Rigoni, Vicenza (IT); Cristiano Oliva, Gorgonzola (IT)

(73) Assignee: Datalogic S.p.A., Bologna (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/876,460

(22) Filed: Jun. 28, 2004

(65) Prior Publication Data

US 2004/0232238 A1 Nov. 25, 2004

Related U.S. Application Data

(63) Continuation of application No. 09/598,608, filed on Jun. 21, 2000, now Pat. No. 6,808,114.

(30) Foreign Application Priority Data

Feb. 23, 2000 (EP) .................................. 00830127

(51) Int. Cl.
*G06K 7/14* (2006.01)
(52) U.S. Cl. .................................. 235/454; 235/462.42
(58) Field of Classification Search ................ 235/435, 235/436, 437, 454, 462.01, 462.42
See application file for complete search history.

(56) References Cited

U.S. PATENT DOCUMENTS

| | | | | |
|---|---|---|---|---|
| 4,496,831 | A | * | 1/1985 | Swartz et al. ............... 235/472 |
| 4,835,374 | A | | 5/1989 | Swartz et al. |
| 5,010,241 | A | * | 4/1991 | Butterworth ................ 235/462 |
| 5,140,141 | A | | 8/1992 | Inagaki et al. |
| 5,587,704 | A | * | 12/1996 | Foster ........................ 340/573 |
| 5,684,287 | A | * | 11/1997 | Walts .......................... 235/462 |

(Continued)

FOREIGN PATENT DOCUMENTS

| | | | |
|---|---|---|---|
| EP | 0 238 067 | | 9/1987 |
| EP | 90312170.5 | * | 7/1990 |
| JP | 03219853 | * | 1/1994 |
| JP | 8-202806 A | | 8/1996 |

OTHER PUBLICATIONS

Scanteam 3400 Series product literature, published by Welch-Allyn, 1998.*

(Continued)

*Primary Examiner*—Daniel Stcyr
*Assistant Examiner*—Daniel A. Hess
(74) *Attorney, Agent, or Firm*—Nixon & Vanderhye, P.C.

(57) ABSTRACT

In an apparatus and a method for acquiring and reading optical codes, the indication of the reading result is carried out projecting a luminous figure onto the optical code, that is to say in the position on which the attention of the operator is focused. The luminous figure can have an information content also more complex than the simple indication of the end of the reading.

48 Claims, 4 Drawing Sheets

U.S. PATENT DOCUMENTS

| | | | | |
|---|---|---|---|---|
| 5,825,011 A | * | 10/1998 | Suzuki et al. | 235/472.01 |
| 5,856,660 A | * | 1/1999 | Bard et al. | 235/462 |
| 5,959,282 A | * | 9/1999 | Tabuchi | 235/462 |
| 5,969,321 A | | 10/1999 | Danielson et al. | |
| 5,992,749 A | | 11/1999 | Seo et al. | |
| 6,158,662 A | * | 12/2000 | Kahn et al. | 235/472.01 |
| 6,206,286 B1 | * | 3/2001 | Watanabe et al. | 235/462.01 |
| 6,332,575 B1 | * | 12/2001 | Schuessler et al. | 235/462.13 |
| 6,808,114 B1 | * | 10/2004 | Palestini et al. | 235/454 |

OTHER PUBLICATIONS

Yamada Yasuo, *Patent Abstracts of Japan*, vol. 1996, No. 12, JP 08202806.

European Search Report mailed Mar. 10, 2004 in corresponding EP application 03027072.2-2210.

Patent Abstracts of Japan, vol. 1996, No. 12, Dec. 26, 1996 & JP 08 20280 A (Nippondenso CO LTD) Aug. 9, 1996.

* cited by examiner

APPARATUS AND METHOD FOR
ACQUIRING AND READING OPTICAL
CODES WITH RESULT INDICATION

CROSS REFERENCE TO RELATED APPLICATIONS

The present application is a continuation of U.S. application Ser. No. 09/598,608 filed Jun. 21, 2000, now U.S. Pat. No. 6,808,114.

BACKGROUND OF THE INVENTION

1. Field of the Invention

The present invention relates to an apparatus and a method for acquiring and reading optical codes, with indication of the result of the reading itself.

2. Description of the Prior Art

In this description and the following claims, by the expression "optical code", bar codes, stacked codes, that is, with a plurality of stacked bar sequences, bidimensional codes, colour codes, and the like should be meant.

Moreover, by "acquisition of an optical code", the whole of illumination (or scan) of the code with a light beam, detection of the light diffused by the code, and its transformation into electric signal is meant, while by "reading of an optical code", the processing of the electric signal and its interpretation or decoding are meant.

Finally, by "indication of the reading result", also the mere indication of the end of the reading, or of the unsuccessful reading attempt, is meant.

Known optical code acquisition and reading apparatuses, or briefly, readers, are essentially provided with a light source for generating a light beam which is projected onto the optical code to be read, for example through slits and lenses, herein in general referred to with the expression "illumination optics", optical elements suitable to collect and focus the light diffused by the code, for example slits and lenses (in general referred to with the expression "receiving optics"), photosensitive elements on which the light collected by the receiving optics is focused, suitable to detect the light diffused by the code and to convert it into an electric signal reproducing as much accurately as possible the reflectance modulations of the elements making up the code, as well as processing means for interpreting or decoding the code so as to obtain the significant information contained in it, such as for example manufacturer, name of the specific product, production lot, price, etcetera.

The operation of reading a particular optical code can give negative results for various factors, among which the imperfection of the code due, for example, to damages to the label on which it is obtained, the distance between the reader and the code, or the maintenance of said distance during the scanning time. In addition, also when the code is correctly acquired, its decoding may be impossible because, for example, it does not fall within the categories of codes known by the reader. In any case, the operator needs to know whether the code has been decoded before proceeding to read another code.

These problems are especially severe in the case of the so-called manual or hand-held readers, of the gun type.

Thus, in optical-code readers, simple indication devices are known and currently used for indicating to the user that the particular aimed optical code has been decoded by the reader.

Said indication is normally generated using a light source made up of one or more light emitting diodes (LEDs) arranged in the reader body, in the proximity of the outer surface or inside it. Since in both cases the LED must be visible from the outside, the light emitted by the LED can be refracted and/or diffused so as to be more visible towards the operator. However, the image of the reader body usually is at the edges of the operator's field of view, whose look is focused on the optical code. This is particularly true for codes of small sizes, or for stacked codes, whose reading requires a precise movement of the hand. Thus, the perception of the lighting of the LED arranged into the reader body may not be immediate.

To improve the perception of the indication that the reading has occurred, also when the visual attention of the operator is not focused on the reader, the lighting of the LED is commonly accompanied by an acoustic signal, provided for example by an electromagnetic acoustic horn, commonly called buzzer, or beeper. However, also this provision is not totally satisfactory since the acoustic signal cannot be easily heard if the operation is carried out in a noisy environment or by an operator with auditory deficiency. Moreover, a frequently repeated acoustic signal may be annoying for the operator who must carry out very frequent readings and/or for a long time interval.

The European patent application N. 98830656.9 by the same Applicant, which represents a document of the prior art according to Art. 54(3) EPC, describes an optical device comprising at least one illuminating assembly active on a portion of the reading area along an emission optical path, wherein said at least one illuminating assembly comprises: a light source; a diaphragm having a predetermined shape for selecting a portion of the light generated by said source; and a converging lens arranged downstream of the diaphragm for collimating the shaped light coming from the diaphragm and projecting it onto the portion of reading area.

However, said device is intended for the aiming and the visual indication of the area in which the optical code is, while the above document does not provide for any indication on the use of such a device for indicating the result of the optical-code reading.

SUMMARY OF THE INVENTION

The technical problem underlying the present invention is to provide an apparatus and a method for reading optical codes, which should be capable of providing an indication of the reading result immediately perceptible by the operator.

A more ambitious object of the present invention is to provide such an apparatus and method, wherein the indication of the reading result should be more significant, that is, with greater information content.

The Applicant has found that the aforesaid technical problem can be successfully overcome by projecting a luminous figure on the optical code being read, that is to say, in the position on which the operator's attention is focused. Moreover, making use of this inventive idea, it is possible to project, at the code, a wide range of useful information for the operator, also more complex and elaborate than the simple indication of the end of decoding, thus satisfying also the aforesaid second object.

Thus, in a first aspect thereof, the present invention relates to an apparatus for acquiring and reading optical codes, comprising:

means for acquiring the optical code, having at least one acquisition light source, means for reading the acquired optical code, and means for visually indicating the reading result, characterised in that said visual indication means comprises:
at least one indication light source, distinct from or coinciding with, the at least one acquisition light source of said acquisition means,
means for imposing an information content indicating the reading result to the light emitted by said at least one indication light source, and
means for projecting the light, having the imposed information content, substantially at the optical code.

In this description and the following claims, by "substantially at the optical code" it is meant on the surface bearing the optical code and in close proximity or coincidence with the optical code itself.

Advantageously, the means for reading the optical code comprises means for communicating the acquired code to a remote processing unit and for receiving the reading result therefrom.

In an embodiment, the means for imposing the information content comprises a switch for switching on and off the at least one indication light source. This embodiment has the advantage of being very simple.

In an alternative embodiment, the means for imposing the information content comprises at least one element for selectively transmitting the light generated by the at least one indication light source. With this provision, it is possible to generate luminous figures having such shapes or hues as to be immediately recognisable by the operator as being different from the illumination line used for acquiring the code, by simply switching on and off the light source.

More in particular, the selective transmission element can be a diffractive element, a diaphragm having a predetermined shape, a slide, a reflecting surface having a predetermined shape and a shutter. For example, in the case of a diaphragm, the predetermined shape can consist in an elementary geometrical figure or it can have greater suggestive content. If the light source emits white light, it is also possible to use a colour slide. In the case of reflecting surface, the light transmitted to the projection means can alternatively be only the reflected light or only the light that is not back reflected.

As an alternative, the selective transmission element can be a diffractive element or a hologram. In this case, the information content is imposed by modifying the wave front of the light beam. The diffractive elements can be, for example, diffractive gratings, and the holograms can be, for example, Computer Generated Holograms.

In another embodiment, the means for imposing the information content comprises a driving circuit of the at least one light source. In fact, also by properly driving the light source, it is possible to obtain projected images immediately recognisable by the operator as being different from the illumination line used for acquiring the code.

Preferably, the driving circuit is suitable to drive the at least one indication light source also in such an operating condition that the at least one indication light source is the acquisition light source during the acquisition of the optical code. By providing a shared light source for both the acquisition of the optical code and the indication of the reading result, it is possible to maintain a small size of the apparatus and low costs.

Advantageously, the at least one indication light source is a light source capable of emitting light of at least two chromatic components, and the driving circuit is suitable to drive the at least one indication light source so as to generate each time light of one or more of said chromatic components. In this way, the projected image has an information content coded by its colour. Moreover, one of the generated hues can be that needed for acquiring the code.

As an alternative, the driving circuit is suitable to switch on the at least one indication light source at least intermittently. Also with this provision it is possible to generate projected images differentiated by intermittence times and distinguishable from the light emitted by the acquisition source, which is typically continuous. Moreover, the light source can coincide with the acquisition source. Said light source typically is a plurality of LEDs or a laser beam which, for the acquisition of the code, is evenly scanned on the optical code, while for the indication of the reading result, it is made intermittent or kept still so as to generate a fixed luminous point.

Alternatively, the driving circuit can be suitable to modulate the intensity of the at least one indication light source. Also in this way, it is possible to generate projected images differentiated from one another and with respect to the acquisition light, typically having even and constant intensity, both with separate light sources and with the same light sources used for the acquisition.

Typically, the means for projecting the light comprises at least one converging lens for collimating the light and focusing it substantially at the optical code.

Advantageously, the means for projecting the light is comprised of the illumination optics of the acquisition means. In this way, the apparatus can keep a small size and low cost.

Analogously, the means for projecting the light can be comprised of the receiving optics of the acquisition means.

Advantageously, the visual indication means also comprises second means for projecting the light emitted by the at least one light source or a second light emitted by a second indication light source towards the operator of the apparatus. Alternatively or in addition, the apparatus can comprise acoustic indication means associated to the visual indication means. Retaining in this way also the traditional modalities of indication, in practice the apparatus is suitable for all operating conditions.

In a second aspect thereof, the present invention relates to a method for acquiring and reading optical codes, comprising the steps of acquiring and reading an optical code through an optical code acquiring and reading apparatus, and visually indicating the result of the reading step, wherein the indication step is carried out by generating at least one luminous figure substantially at the optical code.

Preferably, the method comprises the step of discriminating the result of the reading step, and the indication step is carried out by generating a predetermined luminous figure associated to the particular discriminated result. By providing different indications associated to the particular reading result, the operator is in any case provided with an indication.

Typically, the result discrimination step is carried out by discriminating between positive result and negative result.

Preferably, the result discrimination step is carried out by discriminating among positive result and at least two different negative results. In this way, the operator can recognise, for example, if the reading is impossible due to causes relating to the optical code or due to a wrong operation of the reader, and he can thus implement, where possible, the necessary corrective measures, otherwise giving up further attempts.

Preferably, the indication step is carried out only after having repeated the reading step for a predetermined number of times receiving a negative result. In this way, temporary reading faults can be automatically overcome.

Typically, the predetermined luminous figures generated in the indication step are differentiated by hue, shape and/or dynamics of the luminous intensity. In all these ways, or by properly combining them, it is possible to transmit also complex information contents to the operator of the optical code reader.

Advantageously, the indication step is carried out by also generating at least a second luminous information at the optical code acquiring and reading apparatus.

Moreover, preferably, the luminous information generated substantially at the optical code is turned off before turning off the second luminous information at the optical code reading apparatus. With this provision, it is possible to generate a short indication in the ideal location and a longer visual indication, even if not in the ideal location.

BRIEF DESCRIPTION OF THE DRAWINGS

Further features and advantages of the present invention will now be illustrated with reference to some embodiments, depicted by way of not-limiting example in the attached drawings, wherein.

DETAILED DISCUSSION OF THE PREFERRED EMBODIMENTS

Figure 1:
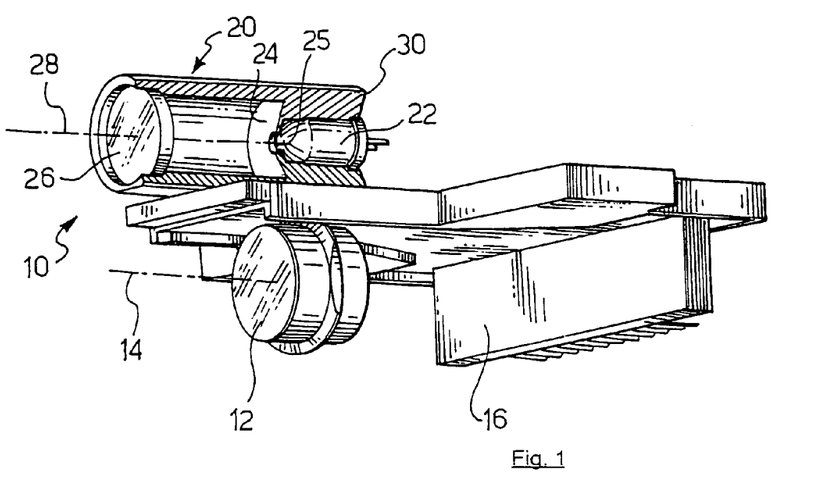
FIG. 1 shows a partial view of an apparatus for reading optical codes having indication means separate from the means for acquiring the code.

FIG. 1 schematically shows a portion of an apparatus 10 for reading optical codes incorporating a first embodiment of the present invention. The receiving portion of the optical code reader 10 is shown, comprised of an objective 12 having a reception axis 14, and of a sensor 16, while the portion for illuminating the optical code is not illustrated.

In fact, this embodiment of the present invention provides for the use of a totally separate light source and optics for indicating the result of an optical code reading, which indication occurs by projecting a luminous figure towards the surface bearing the optical code.

More in particular, the apparatus 10 shown in FIG. 1 comprises indication means 20 in the form of a light source 22, a diaphragm 24 substantially adjacent to the light source, and a lens 26, kept aligned along an optical axis 28 by a support 30.

In the simplest embodiment, diaphragm 24 and lens 26 are not essential, as the mere switching on of LED 22 is sufficient for the luminous indication.

Light source 22 can be, for example, a light emitting diode (LED), preferably independently fed with respect to any other LEDs (or laser diodes) used in the reader for illuminating the code. Light source 22 must be sufficiently luminous for generating a luminous figure which must be clearly visible also in a well-lighted environment. LEDs available on the market that can be used as the light source 22 are, for example, the LEDs model HLMP-CM15 supplied by Hewlett Packard, Palo Alto, Calif. (USA), with an epoxy resin package having a diameter of 5 mm, peak wavelength ($\lambda$) of $\lambda=524$ nm and emission angle of 15°, or the LEDs model LT5413 by OSRAM, Munich, Germany, having a peak wavelength $\lambda=525$ nm and package and emission angle equal to the LEDs of the previous type. Both these LEDs emit a green light.

In fact, the light source 22 of the indication means 20 can emit light of any colour, but green light is preferably used. In fact, green light is universally used for giving positive indications or indications of a good operation, as for traffic lights or the indication LEDs on electronic equipment, and in addition, the light of the illuminator for acquiring of the code is usually red; thus, green light allows highlighting the difference with respect to the light projected for illuminating the optical code for its acquisition.

The optical code reader can be of the type comprising some LEDs and an illumination optics for illuminating the optical code, and a receiving optics and a sensor of the charge coupled device (CCD) type, or of the Complementary Metal Oxide Semiconductor (C-MOS) type for receiving the luminous signal coming from the code and transforming it into an electric signal. Moreover, both types of sensors can be of the linear or of the bidimensional type. The reader can also be of the type comprising a laser diode, an illumination optics and scan means for generating a scan and thus, illuminating the optical code, and a receiving optics and a photodiode for receiving the luminous signal coming from the code, and transforming it into an electric signal. In the continuation of this description, the expressions "means (or light sources) for illuminating the optical code and/or for acquiring the optical code" will be used without distinction for both types of optical code readers.

Moreover, both types of readers comprise means for processing the electric signals and decoding the optical code read. The means for processing the electric signal and/or for decoding the code can be contained "on board" of the reader itself, or they can be "remote". That is to say, through a cable or cordless connection the electric signals can be sent to a processing unit far from the reader, which processing unit then communicates to the reader the occurrence or non-occurrence of the code decoding (or reading). In the continuation of this description, the processing of the electric signal and/or its decoding are referred to with the expression "code reading".

As an alternative to monochromatic LEDs, which emit in a restricted band of the visible spectrum, it is possible to use LEDs that emit a substantially white light or other variants, which shall be further described hereafter.

Diaphragm 24 is intended to block part of the light emitted by the light source 22. Said diaphragm can be of any shape, wherein its portion transparent to the luminous radiation is made with the shape of the desired luminous figure to be projected, as visual indication of the reading result, on the optical code or in its immediate proximity.

For example, diaphragm 24 can have a circular-shaped free aperture 25. Diaphragm 24 is advantageously arranged substantially in contact with LED 22 in order to allow a portion of light as wide as possible to pass through the free aperture 25. Moreover, diaphragm 24, can be made as a separate piece to be inserted into support 30, or it can be directly obtained in the support 30.

As an alternative to the circular shape, the free aperture 25 of diaphragm 24 can have any other shape. For example, in terms of the immediacy of the result indication, it can be advantageous to use free apertures 25 having a more significant shape, such as a checkmark (✓), a caption such as "OK", "READ" or the like, a more complex figure such as a closed hand with the thumb up, or the manufacturer's logo.

On the contrary, if the result indication represents the negative result of the reading, it can be advantageous to use symbols such as an X or captions such as "NO", "FAIL", or the like, or a more complex figure such as a closed hand with the thumb down.

In addition, it is possible to use more diaphragms at the same time, illuminated by the same source or by a respective source in order to obtain several spaced luminous figures, or a diaphragm 24 having more free apertures 25. Moreover, it must be evident that in each case, diaphragm 24 or the like can be illuminated by more than one LED so as to increase the intensity of the luminous figure.

Diaphragm 24 must be considered as exemplary for means for imposing an information content to the projected light, i.e. for generating a particular preselected figure. In this respect, diaphragm 24 provided with the free aperture 25 allows obtaining a projected image having only two luminosity levels (light and shadow). In order to obtain a scale of intermediate luminosity levels between dark and light, it can be advantageously replaced with a variable-transparency membrane or with a slide, which in the case of using a light source 22 emitting white light, can be a colour slide.

In a further alternative embodiment, the light beam emitted by source 22 can be shaped by a reflecting surface substantially having the same shape as the desired luminous figure to be used as a result indication, and being arranged so as to intercept part of the light of the light source 22 and send it towards lens 26. Manifestly, in this case the three elements will not be aligned along the optical axis 28. Alternatively, the reflecting surface can be used for transmitting the non-reflected light as indication figure complementary to its shape. In this case, the back-reflected light can for example be used as the source of the traditional indication means, which emits at the body of the reading apparatus.

Advantageously, apparatus 10 can comprise more than one indication system 20 such as that exemplified, each used for a different indication. For example, besides indicating the successful reading, it is possible to indicate that the decoding of the optical code was not possible within a maximum time or a maximum number of attempts. In this case, for example, a red luminous figure shall be used, for example an X. More advantageously, the negative result of the decoding can be discriminated from a series of typologies, for example because the code is damaged, or because in the specific operating conditions, the reader is not capable of carrying out the decoding, or because the code read does not fall within the categories known by reader 10. The generated indication figure will be differentiated in various ways, for example by its colour and/or shape.

In an equivalent way, it is possible to use indication means allowing the projection of a variable luminous figure so as to provide more information to the operator of apparatus 10. For example, also in absence of diaphragm, the light source 22 can be made up of any set of two or more LEDs with a predetermined geometrical arrangement, of a back-lighted Liquid Crystal Display (LCD), of a segment LED matrix as alphanumeric displays (for example, that commercially available as SA05-11SRWA from Kingbright, Taiwan, comprised of seven-segment LEDs, having wavelength $\lambda=660$ nm, and representing characters with a height of 12.7 mm), of a dot LED matrix (for example, that commercially available as TA07-11SRWA from Kingbright, formed of 5×7 dots, having dimensions of 12.7×18 $mm^2$, and emitting light with peak wavelength $\lambda=660$ nm). Said alphanumerical result indication can be used for indicating an error message explaining the reason why the code is not read. In the case of positive result of the decoding of the optical code, the same indication can at the same time provide information relating to the content of the optical code read, or to part of it, for example the product or the manufacturer's name, or a category among a series of preselected categories. For example, each product can be associated to the place where it is to be stored, possible discounts applied to the product, etcetera.

Alternatively, as light source it is possible to use multi-chip LEDs containing two or more chips, with different emission bands, and which can be turned on independently, such as for example the red and green dual-chip LED LU 5351-JM commercially available from OSRAM, or RGB LEDs such as the LEDs KAA-3528 EMBSGC from Kingbright. The last-mentioned have three chips emitting in the three primary colours (red, green and blue) independently drivable to obtain the complete range of colours perceptible by human eyes. In this way, the different colours can be used to give specific result indications to the operator.

The converging lens 26, which can be for example a simple plano-convex spherical lens of plastic material, obtained through moulding, is for projecting the light exiting from the free aperture 25 of diaphragm 24 (or, in any case, the figure obtained with the equivalent means described above) substantially towards the optical code. For this purpose, it is arranged at such a distance from diaphragm 24 as to focus the figure on the surface of the optical code at a finite distance, falling within the reading range of the means for acquiring the code of apparatus 10.

Alternatively, the beam can be collimated, that is, diaphragm 24 can be focused to infinity by lens 26 to limit as much as possible the size increase of the transmitted beam as the distance from lens 26 increases.

The mechanical support 30 is for containing and retaining the above elements, namely light source 22, diaphragm 24 and lens 26, or their equivalents, in fixed position. For this purpose, it is provided with respective seats, for example slots, not revealed for clarity in FIG. 1. Support 30 is obtained, for example, through moulding, and advantageously, in the same block comprising the optical acquisition camera of the reader. Such a solution allows greater repeatability in the alignment among the axis of the illumination means, the reception axis 14 and axis 28 of the indication projector; moreover, such a solution allows a faster assembling of the pieces. Alternatively, support 30 can be obtained in the shell enclosing apparatus 10.

Each support 30 of the indication means 20 can be arranged in any point of the reader, provided that the indication light beam is not obstructed. In the embodiment shown in FIG. 1, the projection system is unique, and the relating support 30 is arranged above the optical receiving camera of the reader, with axis 28 parallel to the reception axis 14 and in symmetrical position with respect to a vertical plane passing through the same reception axis 14. In this way, the centre of the luminous figure and that of the illumination figure, typically a scan line, are separated by the same quantity as the distance from the plane of the optical code varies.

Alternatively, the two axes 14, 28, can be inclined with respect to one another, and they can intersect at a distance comprised in the reading range so as to reduce the separation between the indication figure and the illumination figure in the normal operating conditions.

Figure 2:
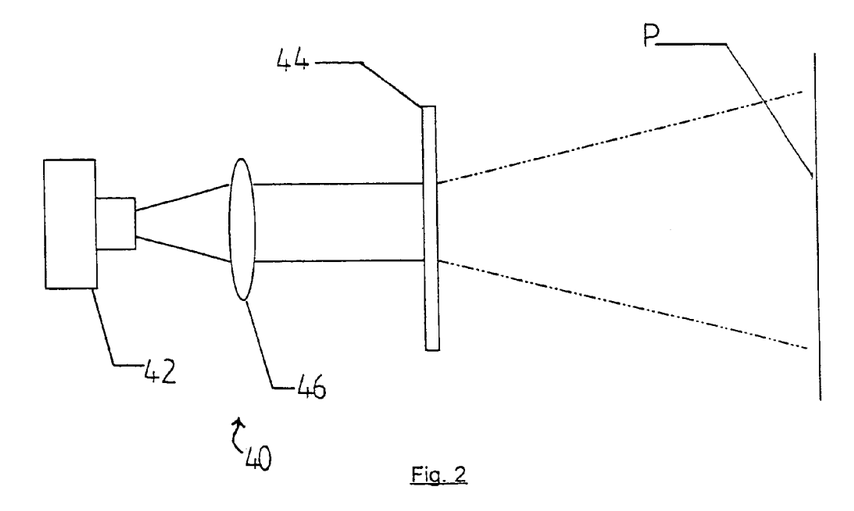
FIG. 2 schematically shows laser indication means for such an apparatus.

FIG. 2 illustrates another embodiment of the indication means, as a whole referred to with 40. This indication means is provided with a laser diode 42 as the light source, a collimating objective 46, comprised of one or more lenses, and, possibly, a diffractive element 44 or a hologram, arranged downstream of collimator 46, generating the desired luminous figure on plane P (containing the optical code, or tangent to the surface containing it).

The use of laser 42 as the light source allows having more brilliant luminous figures than those obtainable even with a high-intensity LED. The use of diffractive and/or holographic elements 44 with laser light allows generating a sharp figure in a greater distance range. In an alternative embodiment, the diffractive element or hologram 44 is omitted, and the luminous figure is traced on the code plane by a collimated laser beam, the aiming direction of which is modified instant by instant to draw a bidimensional figure on plane P. Systems of this type, so-called 2D scan engine lasers, are known.

Figure 3:
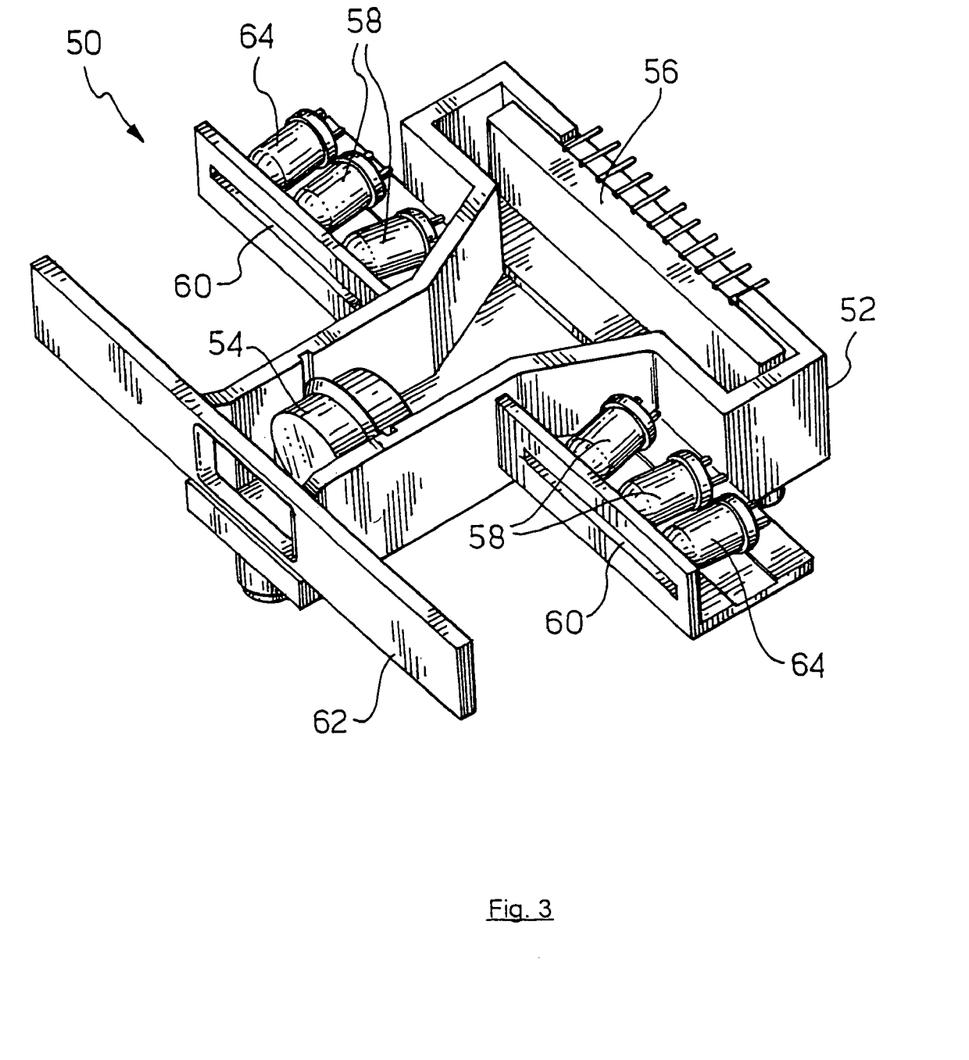
FIG. 3 shows a partial view of an apparatus for reading optical codes having indication means integrated with the means for acquiring the code.

FIG. 3 shows another embodiment of apparatus for reading optical codes according to the invention, wherein the same optics of the illumination system for acquiring the optical code is used, at least partly, for the visual indication of the reading result.

Apparatus 50 comprises a support 52, properly shaped for housing the elements needed for illumination and reception during the optical code acquisition. Besides objective 54 and the receiving sensor 56, FIG. 3 illustrates the illumination source 58, and slits 60 and lens 62, making up the illumination optics. More in particular, the illumination source 58 shown is comprised of a plurality of LEDs, which typically emit red light that is shaped into a line by slits 60. According to the invention, at least one additional or indication LED 64 is provided, arranged next to the illumination LEDs 58. The indication LEDs 64 emit light which preferably is of a different colour with respect to the illumination LEDs 58, for example green light, so that the generated indication figure consists in a line similar to the scan line, but of a different colour. Alternatively, or in addition, a diaphragm (not shown) or any equivalent element, as described above with reference to FIG. 1, can be arranged in front of the (or each) indication LED 64, so as to obtain a luminous figure having a different shape with respect to the scan line.

This solution allows using the same optics as the illumination system and thus, besides the LEDs, it does not require the introduction of additional components in the reader system. It is worth noting that the light emitted by the indication LEDs 64 does not interfere with the acquisition of the optical code because, as it shall be described shortly, the indication LEDs 64 are turned on only when the acquisition has occurred, i.e. when sensor 56 is not active anymore.

According to a variation, the indication LEDs can be arranged at the sides of sensor 56, and the optics used for focusing the indication sources is the reader receiving one (travelled in the opposite direction). Also in this case, the indication LEDs are turned on only when the acquisition has occurred, that is to say, when sensor 56 is not active anymore.

In a more advantageous alternative embodiment, the same illumination sources used for acquiring the optical code are used for indicating the reading result. In this case, different means is used for varying the light projected onto the optical code, imposing the desired luminous figure on it.

When said shared illumination source is made up of monochromatic LEDs, which for the code acquisition must illuminate the same code as evenly as possible, the variation can consist, for example, in intermittently turning on and off, through a suitable driving circuit not shown, the various LEDs during the indication. Alternatively, the driving circuit can switch them on, one or more at a time (creating, for example, the effect of a travelling luminous line) or their intensity can be changed.

Alternatively, the shared light source can be comprised of multi-chip LEDs which, as already described above with reference to FIG. 1, contain two or more chips, with different emission bands, and which can be turned on independently, such as for example the red and green dual-chip LED LU 5351-JM commercially available from OSRAM, with package having a diameter of 5 mm, emitting at the two wavelengths $\lambda=628$ nm (red) and $\lambda=570$ nm (green), thanks to two independently drivable chips. In this case, only the red chip of each LED is turned on during acquisition, whereas during indication, the red chips are turned off to activate the green ones and change the colour of the projected figure.

Again as already described above with reference to FIG. 1, RGB LEDs such as the LEDs KAA-3528EMBSGC by Kingbright (of the Surface Mount Device type) have three chips emitting light in the three primary colours, red $\lambda=625$ nm), green ($\lambda=565$ nm) and blue ($\lambda=430$ nm), and they can be independently driven to obtain the entire range of colours perceptible by human eyes. Thus, in this context it will be possible to use a colour, typically red, for the illumination during the acquisition, and a series of colours for specific result indications to the operator. For example, green may be used to indicate that the optical code has been correctly decoded; blue to indicate that the optical code cannot be read because it falls outside the reading range; yellow to indicate that the optical code cannot be read because it is damaged; purple to indicate that the optical code does not fall within a category known by the reader, etcetera.

Laser illumination systems for optical code acquisition can also be used as light sources for result indication. In fact, laser optical code readers are typically provided with a mirror system for scanning the laser beam, which serves for generating an even scan line. The same laser source can be used for the indication, by stopping the scan system to obtain a fixed luminous point or by intermittently switching on and off the laser beam.

The various indication means described can be advantageously associated to the visual indication on the body of the reading apparatus and/or to the acoustic indication normally provided for according to the prior art. The flow chart shown in FIG. 4 indicates how the two indications can advantageously be managed. In this flow chart, only the case of indication of a positive reading result is referred to for simplicity, through "LED 1", which represents the indication on the apparatus body, and "LED 2", which represents the light source of the indication means according to the various embodiments described above.

Figure 4:
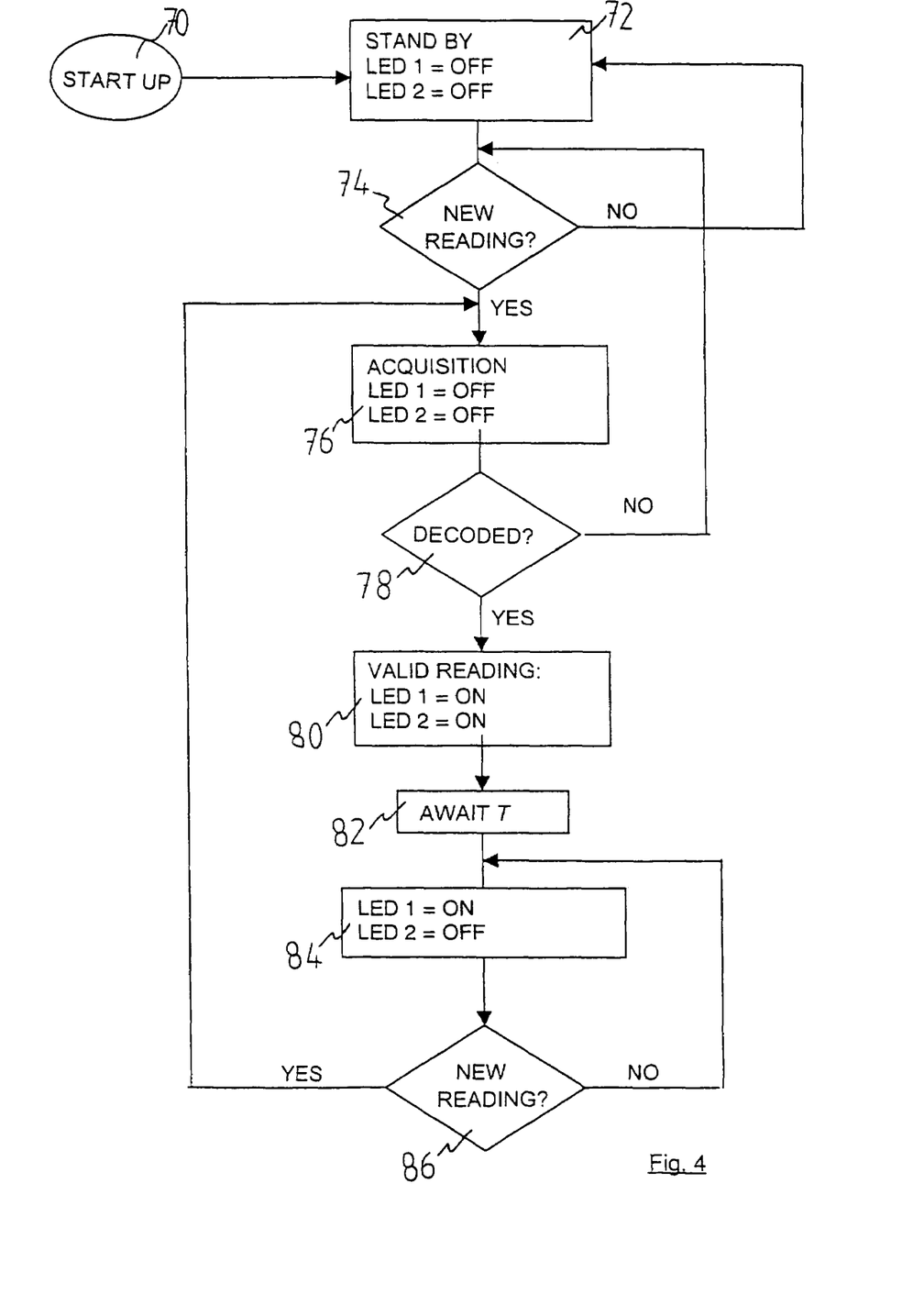
FIG. 4 shows a flow chart useful for describing the method according to the invention.

At the start up in a step 70, the apparatus enters a stand-by mode 72, and LED 1 and LED 2 are both off (OFF). In this mode, and as shown by query 74, the apparatus awaits the start of a reading, for example signalled by pressing a button of the apparatus. During acquisition 76, LED 1 and LED 2 are both still off (OFF), whereas the illumination source is operating. Once the optical code has been acquired, the apparatus checks, in a step 78, whether it is possible to correctly decode the optical code. If not, it returns to the stand-by step 74. In case of positive reading result, in a step 80, this is indicated by the turning on (ON) of both LED 1 and LED 2. At this point, a predetermined time T in a step 82 has to elapse, at the end of which LED 2 is turned off in a step 84, whereas LED 1 is kept on while the apparatus awaits, in a step 86, the start of a new reading, to re-enter at the acquisition step 76.

The different turning off times of LED 1 and LED 2 are due to the fact that the indication through projection requires a relatively powerful light source, so it useful to avoid prolonged operation which might bring to excessive consumptions and to the discharge of possible batteries. On the contrary, the LED or other light source suitable to emit at the reader body can be kept on, having a lower consumption, as indication of the occurrence of the reading available for the operator up to the following acquisition.

However, it is evident that delay T is not absolutely necessary, and that the two LEDs could switch off at the same time.

Figure 5:
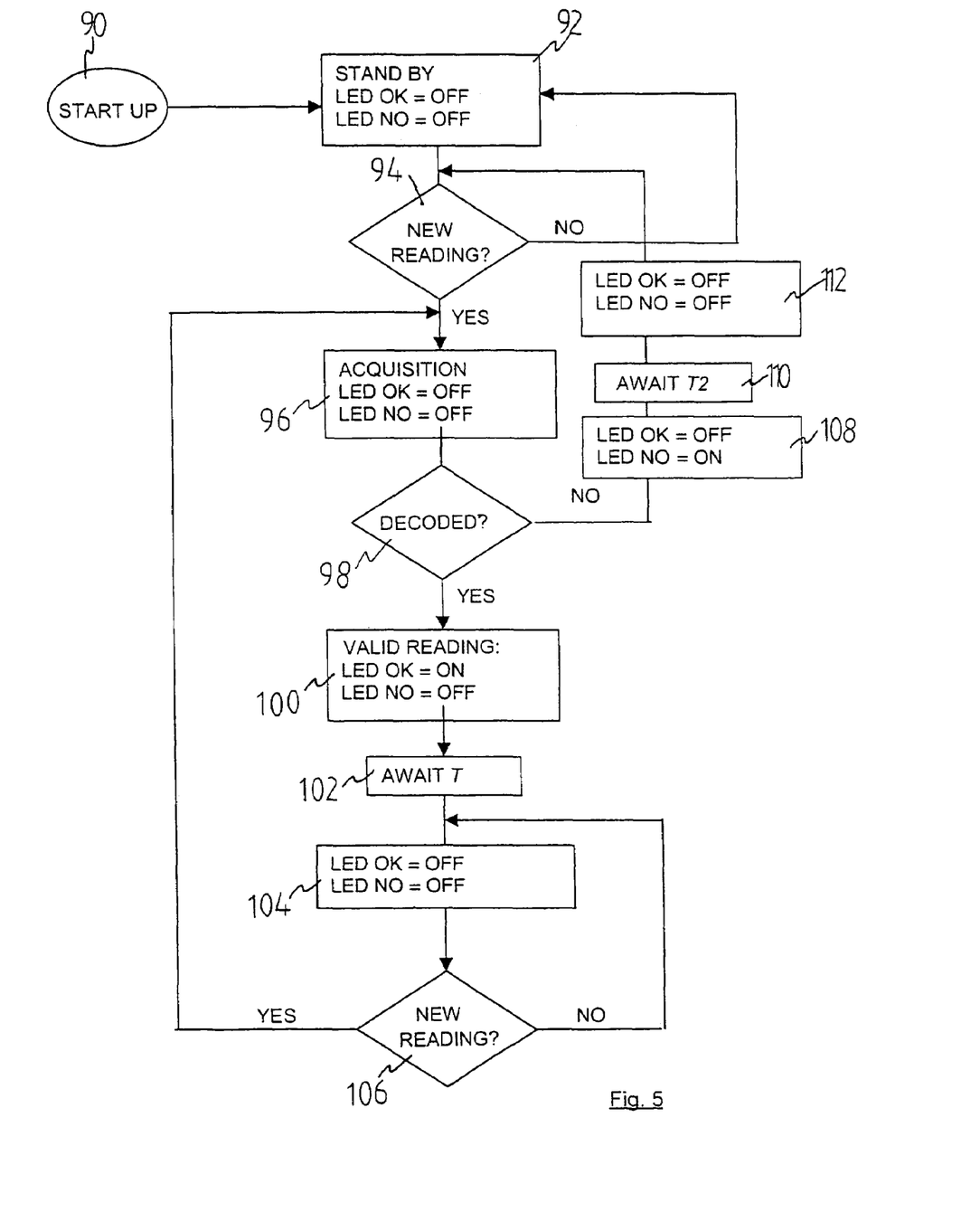
FIG. 5 shows another flow chart useful for describing the method according to the invention.

Still as a matter of mere illustration, the flow chart of FIG. 5 illustrates the management of an indication of both a positive result and a negative result, exemplified by the turning on (ON) and off (OFF) of a LED OK and of a LED NO. Thus, at the start up in a step 90, the apparatus enters in a stand-by mode 92, and LED OK and LED NO are both off (OFF). In this mode and as shown by query 94, the apparatus awaits the start of a reading, for example signalled by pressing a button of the apparatus. During acquisition 96, LED OK and LED NO are still both off (OFF), whereas the illumination source is operating. Once the optical code has been acquired, the apparatus checks, in a step 98, whether it is possible to correctly decode the optical code. In case of positive result of the reading, in a step 100, this is indicated by turning on (ON) LED OK. At this point, a predetermined time T1 in a step 102 has to elapse, at the end of which LED OK is turned off in a step 104, while the apparatus awaits, in a step 106, the start of a new reading, to re-enter at the acquisition step 96. In case of negative result of the reading, from the query step 98 the apparatus passes to the indication of this, in a step 108, turning on (ON) LED NO. At this point, a predetermined time T2 in a step 110 has to elapse, at the end of which LED NO is turned off in a step 112, while the apparatus awaits, in step 94, the start of a new reading.

From the previous description, those skilled in the art will understand that the optical code reading apparatuses described are particularly suitable to carry out a method for reading optical codes comprising the steps of:

(a) reading an optical code through an optical code reading device, and (b) visually indicating the end of the reading step (a) by generating at least one luminous figure substantially at the optical code.

Advantageously, the above method also comprises the step (c) of discriminating the result of the reading step (a); in this case, the indication step (b) is carried out by generating a predetermined luminous figure associated to the particular result discriminated in step (c).

In particular, the result discrimination step (c) can be carried out by discriminating between positive result and negative result, or by discriminating between positive result and at least two different negative results.

Preferably, the result indication step (b) is carried out only after having repeated the reading step (a) for a predetermined number of times receiving a negative result.

In particular, the predetermined luminous figures generated in the visual indication step (b) are differentiated by hue, shape and/or dynamics of the luminous intensity.

Advantageously, the visual indication step (b) can be carried out by generating also at least one visual signal at the optical code reading apparatus. In this case, the at least one luminous figure generated substantially at the optical code read is turned off before turning off the visual signal at the optical code reading apparatus.

Advantageously, moreover, all the embodiments of the apparatus or, respectively, of the method according to the invention, can provide that the different options which are each time available are selectable by the user through the management software of the apparatus, both through the normal user interface and through programming with predetermined codes, for example printed on the reference manual.

It is evident that several modifications, variations, replacements and integrations can be made to the embodiments described above without departing from the scope of the invention, as defined by the following claims.

What is claimed is:

1. An apparatus for acquiring and reading optical codes, comprising:
   an optical code reader having an illuminator for generating an acquisition light pattern at an optical code, said illuminator comprising at least one acquisition light source,
   an indicator for visually indicating, on an area associated with said optical code, a result of a reading of said optical code, said indicator comprising at least one indication light source,
   wherein the indicator, in response to a completed successful reading of said optical code, generates, on said area associated with said optical code, at least one luminous figure which differs from the acquisition light pattern at least in one of shape and size.

2. The apparatus according to claim 1, wherein said optical code reader comprises an illumination optics, and wherein said indicator shares no optical elements with said illumination optics.

3. The apparatus according to claim 2, wherein said at least one indication light source is distinct from said acquisition light source.

4. The apparatus according to claim 1, wherein said at least one indication light source is a laser light source distinct from said acquisition light source and said indicator comprises a laser scan system.

5. The apparatus according to claim 1, wherein said optical code reader comprises a receiving optics for collecting light diffused from said optical code, and wherein said indicator shares no optical elements with said receiving optics.

6. The apparatus according to claim 5, wherein the indication light source is distinct from the acquisition light source and said apparatus comprises a common support for said indication light source and said acquisition light source.

7. The apparatus according to claim 5, wherein the indication light source is distinct from the acquisition light source and said indicator comprises at least one element for imposing a predetermined shape to the light generated by said at least one indication light source.

8. The apparatus according to claim 1, wherein said optical code reader comprises an illumination optics and a receiving optics and said indicator shares no optical elements with the illumination optics and the receiving optics.

9. The apparatus according to claim 1, wherein said indicator imposes to said at least one luminous figure an information content broader than the mere indication that the optical code reading has been completed successfully.

10. The apparatus according to claim 9, wherein said information content is related to at least a part of the content of the successfully read optical code.

11. The apparatus according to claim 9, wherein said indicator comprises a laser scan system.

12. The apparatus according to claim 1, wherein said indicator further generates, on said area associated with said optical code, a visible indication of an unsuccessful reading attempt of said optical code.

13. The apparatus according to claim 12, wherein said visible indication is related to a reason for said unsuccessful reading attempt.

14. The apparatus according to claim 12, wherein said indicator comprises a laser scan system.

15. The apparatus according to claim 12, wherein said visible indication differs from said at least one luminous figure in at least one of luminosity, hue, shape and size.

16. The apparatus according to claim 1, further comprising a driving circuit of said at least one indication light source.

17. The apparatus according to claim 16, wherein said driving circuit is suitable to switch said at least one indication light source at least intermittently.

18. The apparatus according to claim 16, wherein said driving circuit is suitable to modulate the intensity of said at least one indication light source.

19. An apparatus for acquiring and reading optical codes, comprising:
an optical code reader having at least one acquisition light source and an illumination optics for generating an acquisition light pattern at an optical code,
an indicator for visually indicating, on an area associated with said optical code, a result of a reading of said optical code, said indicator comprising at least one indication light source distinct from said acquisition light source,
wherein the indicator, in response to a completed successful reading of said optical code, generates, on said area associated with said optical code, at least one luminous figure, and
wherein said indicator shares no optical elements with the illumination optics of said optical code reader.

20. The apparatus according to claim 19, wherein said optical code reader comprises a receiving optics for collecting light diffused from said optical code, and said indicator shares no optical elements with the receiving optics.

21. The apparatus according to claim 20, wherein said indicator comprises at least one element for imposing a predetermined shape to the light generated by said at least one indication light source.

22. The apparatus according to claim 20, wherein said element is selected from the group comprised of a diffractive element, a diaphragm having a predetermined shape, a slide, a reflecting surface having a predetermined shape, a shutter and a hologram.

23. The apparatus according to claim 20, wherein said at least one indication light source is selected from the group comprising at least two LEDs, a back-lighted Liquid Crystal Display, a segment LED matrix and a dot LED matrix.

24. The apparatus according to claim 20, wherein said indicator includes at least one lens for collecting light coming from said indication light source and projecting said light on said area associated with the optical code.

25. The apparatus according to claim 20, wherein said indicator includes an indication light source, an element for imposing a predetermined shape to the light generated by said indication light source and at least one lens for collecting light coming from said element and projecting said light on said area associated with the optical code.

26. The apparatus according to claim 25, wherein said receiving optics is contained in a block, said indication light source, said element and said at least one lens are contained in a support provided with respective seats, and said support is obtained in said block.

27. The apparatus according to claim 20, wherein said at least one indication light source is a light source capable of emitting light of at least two chromatic components, and wherein the apparatus further comprises a circuit for driving said at least one indication light source so as to generate each time light of one or more of said chromatic components.

28. The apparatus according to claim 20, wherein said indicator comprises a laser scan system.

29. The apparatus according to claim 19, wherein said indicator imposes to said at least one luminous figure an information content broader than the mere indication that the optical code reading has been completed successfully.

30. The apparatus according to claim 29, wherein said information content is related to at least a part of the content of the successfully read optical code.

31. The apparatus according to claim 19, wherein said indicator further generates, on said area associated with said optical code, a visible indication of an unsuccessful reading attempt of said optical code.

32. The apparatus according to claim 31, wherein said visible indication is related to a reason for said unsuccessful reading attempt.

33. The apparatus according to claim 31, wherein said visible indication differs from said at least one luminous figure in at least one of luminosity, hue, shape and size.

34. An apparatus for acquiring and reading optical codes, comprising:
an optical code reader having at least one acquisition light source for generating an acquisition light pattern at an optical code,
an indicator for visually indicating, on an area associated with said optical code, a result of a reading of said optical code, said indicator comprising at least one indication light source,
wherein the optical code reader discriminates between at least two different reading results of said optical code and said indicator, in response to each discriminated reading result, generates, on said area associated with said optical code, at least one luminous figure which differs from the acquisition light pattern.

35. The apparatus according to claim 34, wherein said luminous figure differs from the acquisition light pattern in at least one of shape and size, for each discriminated reading result.

36. The apparatus according to claim 34, wherein the luminous figures generated in response to said at least two reading results differ from one another in at least one of luminosity, hue, shape and size.

37. The apparatus according to claim 34, wherein said indication light source is a laser light source emitting a laser light beam, said indicator comprises a scan system of the laser light beam, and said luminous figure is a bidimensional figure traced, on said area associated with the optical code, by said scan system.

38. The apparatus according to claim 34, wherein said indicator shares at least one element with said optical code reader.

39. The apparatus according to claim 34, wherein said optical code reader comprises an illumination optics and a receiving optics and said indicator shares at least one element with one of the illumination optics and the receiving optics.

40. The apparatus according to claim 34, wherein said at least one indication light source is distinct from the at least one acquisition light source and said optical code reader comprises an illumination optics and a receiving optics, and wherein said indicator shares no optical elements with the illumination optics and the receiving optics.

41. The apparatus according to claim 34, wherein said indicator comprises at least one element for imposing a predetermined shape to the light generated by the at least one indication light source and said element is selected from the group comprised of a diffractive element, a diaphragm having a predetermined shape, a slide, a reflecting surface having a predetermined shape, a shutter and a hologram.

42. The apparatus according to claim 34, wherein said at least one indication light source is selected from the group comprising at least two LEDs, a back-lighted Liquid Crystal Display, a segment LED matrix and a dot LED matrix.

43. The apparatus according to claim 34, further comprising a driving circuit of said at least one indication light source.

44. The apparatus according to claim 43, wherein said driving circuit is suitable to drive said at least one indication light source also in such an operating condition that said at least one indication light source is said acquisition light source during acquisition of the optical code.

45. The apparatus according to claim 34, wherein said at least one indication light source is a light source capable of emitting light of at least two chromatic components, and further comprising a circuit for driving said at least one indication light source so as to generate each time light of one or more of said chromatic components.

46. The apparatus according to claim 34, wherein said indicator imposes to said at least one luminous figure an information content broader than the mere indication of whether the optical code has been read or not.

47. The apparatus according to claim 46, wherein said information content is related to at least a part of the content of a successfully read optical code.

48. The apparatus according to claim 46, wherein said information content is related to a reason for an unsuccessful reading attempt of said optical code.

* * * * *